United States Patent [19]

Yokoyama

[11] Patent Number: 4,775,976

[45] Date of Patent: Oct. 4, 1988

[54] METHOD AND APPARATUS FOR BACKING UP DATA TRANSMISSION SYSTEM

[75] Inventor: Fujio Yokoyama, Hadano, Japan

[73] Assignee: Hitachi, Ltd., Tokyo, Japan

[21] Appl. No.: 911,073

[22] Filed: Sep. 24, 1986

[30] Foreign Application Priority Data

Sep. 25, 1985 [JP] Japan .................................. 60-211929

[51] Int. Cl.$^4$ .............................................. G06F 11/20
[52] U.S. Cl. ....................................... 371/9; 364/187
[58] Field of Search ...................................... 371/8, 9, 7; 364/200 MS File, 900 MS File, 187; 340/825.01, 825.05, 825.16

[56] References Cited

U.S. PATENT DOCUMENTS

| 4,133,027 | 1/1979 | Hogan ........................... 364/200 X |
| 4,500,951 | 2/1985 | Sugimoto ......................... 371/9 X |
| 4,521,871 | 6/1985 | Galdun ............................. 364/900 |
| 4,623,883 | 11/1986 | Konen ............................. 371/9 X |

Primary Examiner—Jerry Smith
Assistant Examiner—Robert W. Beausoliel
Attorney, Agent, or Firm—Antonelli, Terry & Wands

[57] ABSTRACT

A data transmission system is disclosed in which a plurality of data transmission service units and terminals are connected to a data transmission line to effect, e.g., an in-line or local area network and wherein one of the units is used as an actual system service unit and another unit is used as a backup unit. In the service unit, each one of a plurality of processors included therein monitors whether the other processors are operational and whether the processing results generated are valid, and if an error is detected, the data transmission control operation of the service unit is frozen and the service unit is disconnected from the data transmission line. In the backup unit, when it detects the freezing of the data transmission control operation of the service unit through the data transmission line, it starts the data transmission control operation in place of the service unit. The backup method and apparatus are applicable to a POS system and a multiple computer system.

25 Claims, 13 Drawing Sheets

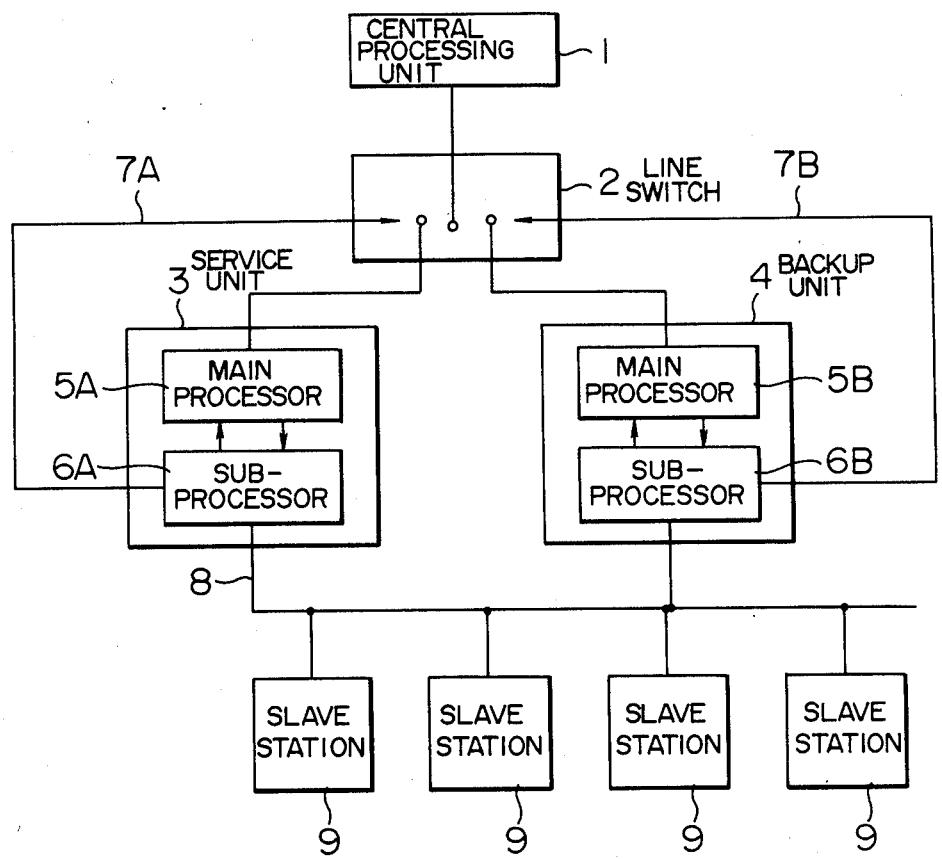
FIG. IA

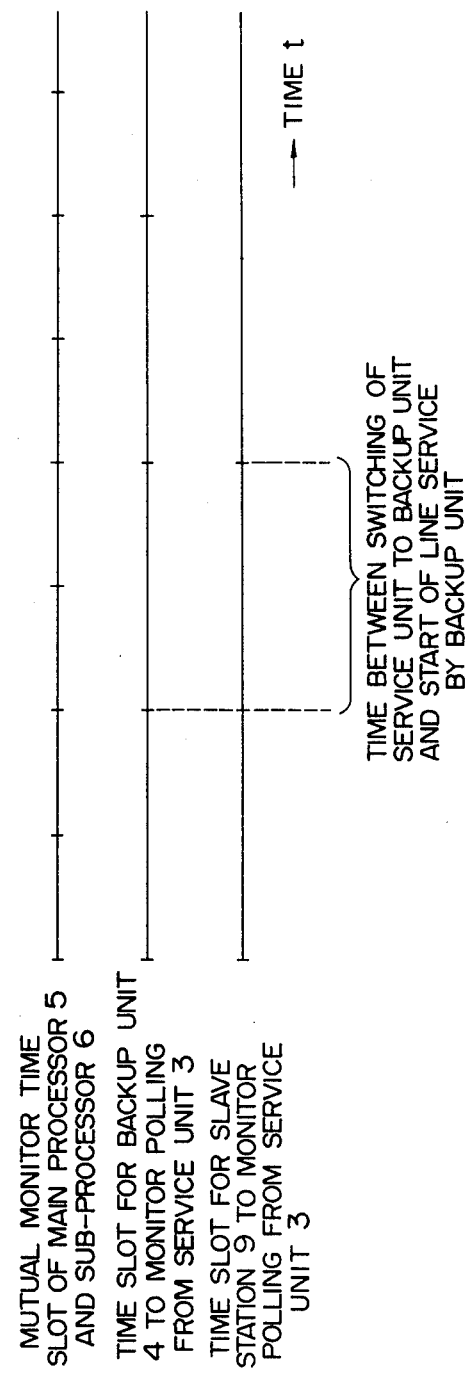

TRANSMISSION / RECEPTION DATA TABLE

METHOD AND APPARATUS FOR BACKING UP DATA TRANSMISSION SYSTEM

BACKGROUND OF THE INVENTION

The present invention relates to a method and apparatus for backing up a master station of a data transmission system having the master station and a slave station, and more particularly to a method and apparatus for preventing an overrun when a failure occurs in the master station or service unit in a POS (point of sales) system or computer network systems.

In a data transmission system, it is common practice to connect a service unit (master station) and a backup unit to a data transmission line in common to terminals (slave station) and use the backup unit when the service unit is down, in order to enhance reliability. In a prior art system of this type such as a daisy chain type disclosed in JP-A-No. 57-81655 laid open on May 21, 1982, a signal line for controlling switching between the service unit and the backup units, in addition to the data transmission line, is connected between the service unit and the backup units, and an inhibit signal is supplied to the signal line to switch the service unit and the backup unit. In this system, each backup unit requires the signal line and a logic unit to control it. Namely, the prior art system needs a number of signal lines and logic units having complex logic functions such as for distinguishing between down state of the service unit and power-off state. This effects in cost increase. Further, because of a noise on the signal line, the logic unit may cause malfunction. Because it is not possible to prevent an overrun signal, due to a failure of the service unit, from being transmitted to the data transmission line, the reliability to the backup operation is not sufficient and the influence of overrun to the slave station cannot be adequately prevented.

SUMMARY OF THE INVENTION

It is an object of the present invention to provide a method and apparatus for switching between a service unit and a backup unit in a data transmission system having the service unit and the backup unit, without requiring an additional or dedicated signal line.

It is another object of the present invention to provide method and apparatus for backing up a data transmission system when a service unit is down, without disturbing other units or causing malfunction.

It is still a further object of the present invention to provide a method and apparatus for backing up a data transmission system to enhance reliability of start of backup operation based on a combination of detections of different factors representing failures of a service unit.

In accordance with a feature of the present invention, a service unit, a backup unit and at least one slave station are connected to a data transmission line, and the service unit and the backup unit each comprises a main processor for controlling itself and at least one sub-processor for performing a specific processing such as line controlling or file processing. Based on empirical facts that a possibility of occurrence of failures simultaneously at two or more of the main processor, sub-processor and junction of the main processor and sub-processor is very remote, the operations thereof are mutually monitored by the main processor and the sub-processor and if a failure is detected, the data transmission control operation is frozen so that influence to other units such as a line service unit or slave station by an error data signal or an overrun signal is prevented.

In the present invention, means to monitor the operation of other units is provided in each of the main processor and the sub-processor, and when a failure is detected, the data transmission control operation of the service unit is frozen or disabled so that the failure service unit is electrically or physically disconnected from the data transmission line. On the other hand, the backup unit can detect the freezing or disabling of the data transmission control operation by the service unit by detecting abnormality or error indication factors such as polling error, abnormal line impedance or absence of token through the conventional data transmission line. When the backup unit detects the failure in the data transmission control operation of the service station, it tests the validity of the data transmission control operation of its own unit and then immediately starts the backup operation to the service unit.

BRIEF DESCRIPTION OF THE DRAWINGS

FIG. 1A is a block diagram showing a service unit/backup unit switching system in accordance with an embodiment of the present invention.

FIG. 1B is a timing diagram for explaining a backup operation between the service unit, the backup unit and a data transmission line in the configuration shown in FIG. 1A.

DESCRIPTION OF THE PREFERRED EMBODIMENTS

Figure 2:
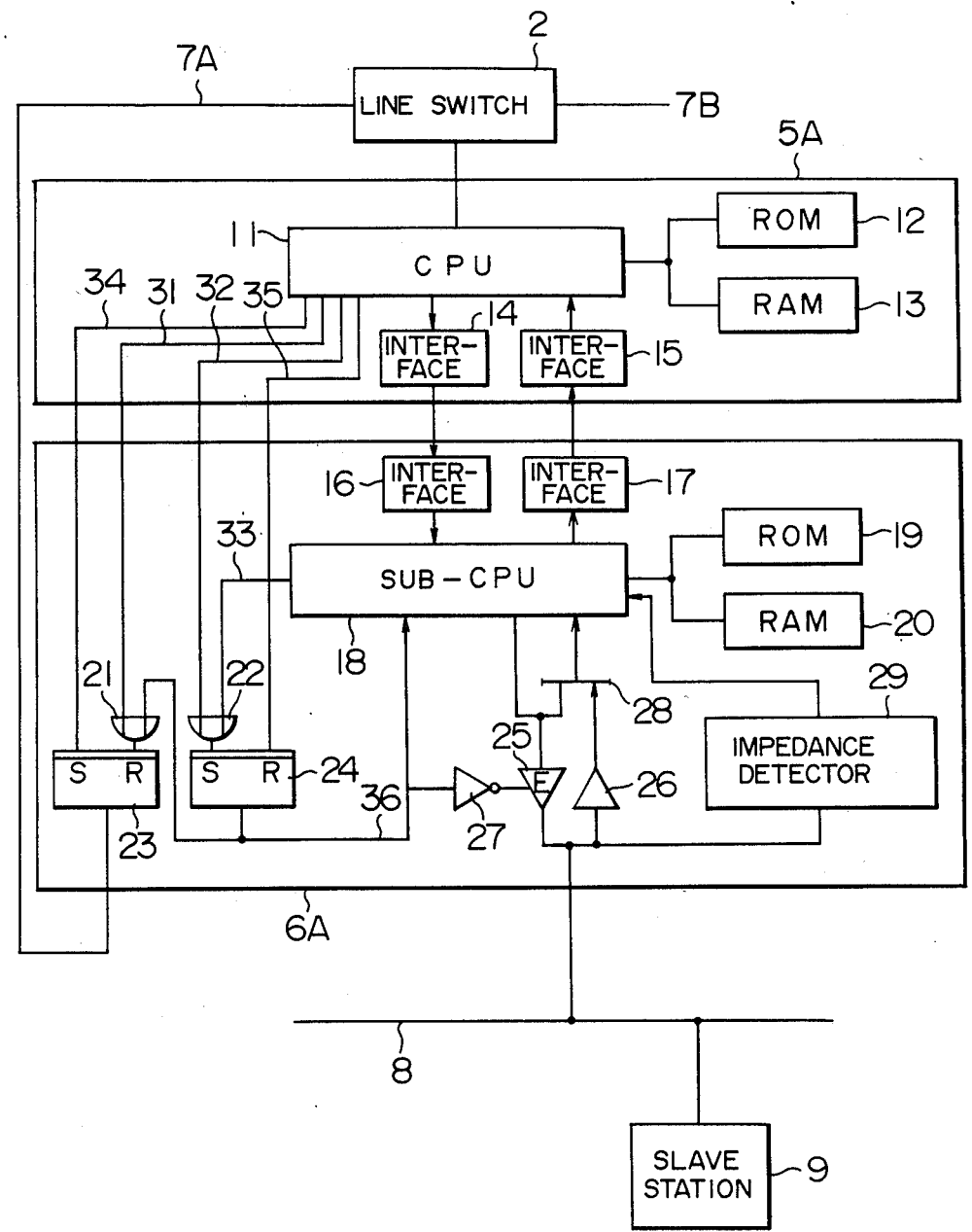
FIG. 2 is a block diagram showing the configuration of a main processor and a sub-processor of the service unit and the backup unit.

In order to facilitate the understanding of the present invention, an embodiment of the present invention applied to a POS system is explained, although it should be understood that the present invention is applicable to a multi-computer system.

FIG. 1A shows a configuration of a data transmission system in accordance with an embodiment of the present invention. A central processing unit 1 is located in a head office of the POS system and performs collective data processings to branch offices. It is selectively connected by a line switch 2 to a service unit 3 or a backup unit 4 located in each branch office. The central processing unit 1 is not essential to the present invention. The service unit 3 comprises a main processor 5A and at least one sub-processor 6A, and the backup unit 4 comprises at least the same elements (circuits) as the service unit 3, that is, a main processor 5B and a sub-processor 6B. The units 3 and 4 respectively have files so that data from slave stations are doubly stored therein. The sub-processor 6A of the service unit 3 serving as a master station controls data transmissions between the master station and a plurality of slave stations 9 connected thereto by a data transmission line 8. The slave stations are usually cash/card registers. The transmission line 8 may be in-line local area network. While the service unit 3 operates normally, the sub-processor 6B of the backup unit 4 functions as the slave station and monitors whether a polling signal is sent from the master station (branch office) during a predetermined time interval or not. When a signal line 7A or 7B is at a logical level "1" or is enabled, it indicates "functions as master station". While the service unit 3 operates normally, the signal line 7A is at a logical level "1" and the signal line 7B is at a logical level "0". The central processing unit 1 is connected to the unit 3 or 4 whose signal line 7A or 7B is at a logical level "1". The other sub-processor may be disk controller or host communication controller.

FIG. 1B shows a relationship between a mutual monitor time of the main processor 5A and the sub-processor 6A and a monitor time for polling from the service unit 3 by the backup unit 4 and the slave station 9. The mutual monitor time (for example, six seconds) of the main processor 5A and the sub-processor 6A is shorter than the monitor time for the polling from the service unit 3 by the backup unit 4 (for exampel, 15 seconds). The monitor time for the polling from the service unit 3 by the slave station 9 is even longer (for example, 30 seconds).

After the backup unit 4 has detected an error or abnormality in the polling from the service unit 4 and before the slave station 9 detects the error in the pollling from the service unit to switch to the off-line mode, the backup unit completes the switching to the service unit operation and starts the line service.

Preparation for the switching to the service unit operation includes loading of a service unit program to a main memory, internal self-check and checking of presence or absence of data transmission. The program is stored in e.g. a magnetic disk unit (not shown) connected to the system.

FIG. 2 shows a block diagram of the main processor 5A and the sub-processor 6A of the service unit 3. The backup unit 4 is similarly configured.

The main processor 5A comprises a CPU 11, a ROM 12, a RAM 13 and logic circuits 14 and 15 for controlling an interface to the sub-processor 6A. The logic circuit 14 is an interface for sending commands and data from the main processor 5A to the sub-processor 6A, and the logic circuit 15 is an interface for sending sub-processor status and data from the sub-processor 6A to the main processor 5A. The sub-processor such as floppy disk drive (FDD) or magnetic card reader (MCR) (not shown) may be connected to the CPU 11 of the main processor 5A in the same manner.

The sub-processor 6A comprises a sub-CPU 18, a ROM 19, a RAM 20, an interface 16 for receiving commands and data from the main processor 5A, an interface 17 for sending status and data of the sub-processor 6A from the sub-processor 6A to the main processor 5A, a latch 23 for generating an enable signal indicating that the service unit is functioning as the master station, to the line switch 2, a latch 24 for holding the entire sub-processor 6A in a reset state, a transmitter 25 for converting a serial data from the sub-CPU 18 to an electrical signal on the data transmission line 8 and transmitting it, a receiver 26 for converting the signal on the data transmission line 8 to an internal signal, a NAND inverter 27 for inverting the output of the latch 24 to enable or disable the transmitter 25, a selection gate 28, and an impedance detector 29 to be described later. The input to the interface 16 is connected to the output of the interface 14 of the main processor 5A, and the output of the interface 17 is connected to the input of the interface 15 of the main processor 5A. The reset terminal of the latch 23 is connected to an output of an OR circuit 21. One input of the OR circuit 21 is connected to a signal line 31 extending from the main processor 5A and the other input is connected to an output line 36 of the latch 24. The signal of the main processor 5A is applied to a set terminal of the latch 23 through the line 34. The main processor 11 can set or reset the latch 23 by setting the signal lines 31 and 34 to logical levels "0" and "1". The output of the latch 23 is supplied to the signal line 7A in FIG. 1A.

The set terminal of the latch 24 is connected to the output of the OR circuit 22, and the inputs of the OR circuit are connected to the signal line 32 extending from the main processor 5A and the signal line 33 extending from the sub-CPU 18. The reset terminal of the latch 24 is connected to the signal line 35 extending from the main processor 5A. The main processor 5A can set and reset the latch 24. The output signal from the latch 24 is applied to the OR circuit 21 through the signal line 36, to the reset terminal of the sub-CPU 18 and to the NAND gate 27. The output of the NAND gate 27 is connected to the enable terminal of the transmitter 25.

Figure 3:
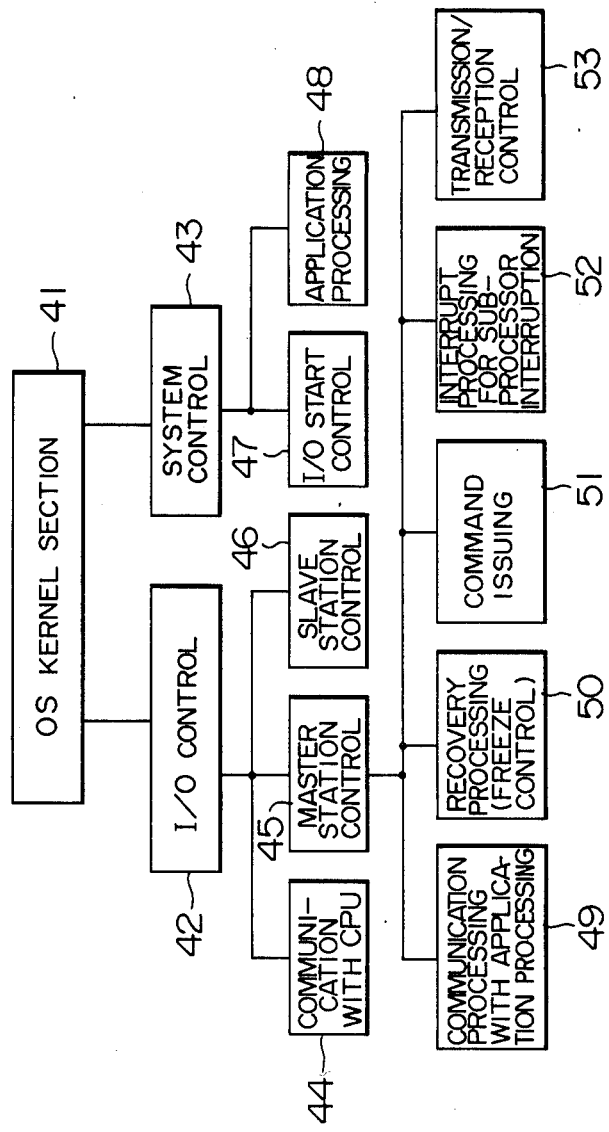
FIGS. 3 and 4 show program structures of a main processor and a sub-processor, respectively.

FIG. 3 shows a program structure of the main processor 5A. Necessary programs are stored in the ROM 12. An OS (operating system) kernel section 41 controls the overall processor. Under the program module, an I/O control section 42 and a system control section 43 are operated. The I/O control section 42 controls I/O devices. A communication control section 44 to the central processing unit 1, a master station control unit 45 for controlling data transmission with terminals and a slave station control section 46 such as control section for FDD and MCR operate under the I/O control section 42. The system control section 43 controls tasks of an application processing section 48 and processes input/output requests of the application processing section 48 through an I/O start control section 47. The master station control section 45 and the slave station control section 46 have communication processing section 49 with the application processing section 48, recovery processing section 50, command issuing section 51 for the sub-processor 6A, interrupt processing section 52 for interruption from the sub-processor 6A, and transmission/reception control section 53. The recovery processing section 50 also has a function to control freezing of the sub-processor 6A. The interrupt processing section 52 reads, checks and analyzes the status of sub-processor 6A. The transmission/reception control section 53 has a function to transmit and receive data and a function to process a data link level.

Figure 4:
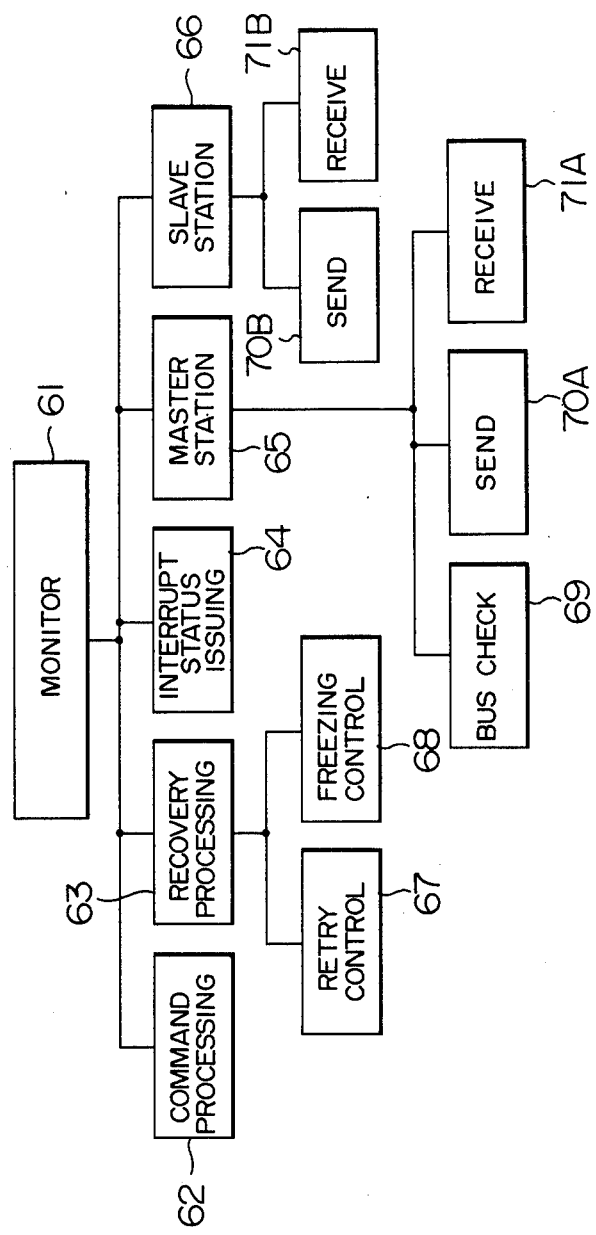

FIG. 4 shows a program structure of the sub-processor 6A. Necessary programs are stored in the ROM 19. A monitor section 61 starts program modules, a command processing section 62 for a command from the main processor 5A, an interrupt status issuing section 64 for the main processor 5A, a recovery processing section 63, a master station function control section 65 and a slave station function control unit 66, and processes end codes prepared by the program modules. The command processing section 62 reads a command issued by the main processor 5A to the sub-processor 6A and checks it by a timer monitor method. The interrupt status issuing section 64 reports processed results of other modules to the main processor 5A. The recovery processing section 63 controls retry to errors generated during data processing by the sub-processor and controls self-freezing. The master station function control section 65 is started when the sub-processor operates as the master station to start lower-order program modules, a bus check section 69 for detecting presence or absence of data transmission, a polling signal send control section 70A and a receive control section 71A. The slave station function control section 66 is started when the sub-processor operates as the slave station and the unit is operated as the backup unit for the master station. Under the module 66, there are a send control section 70B for responding to the polling, and a receive control section 71 for monitoring the polling. The send/receive control sections 70A, 70B, 71A and 71B control input/output processing at a physical level of data and procedures of data link level.

Figure 5A:
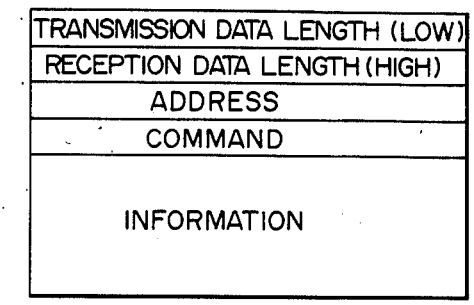
FIGS. 5A, 5B and 5C show a data table of interface information of the main processor and the sub-processor, and formats thereof, respectively.
Figure 5B:
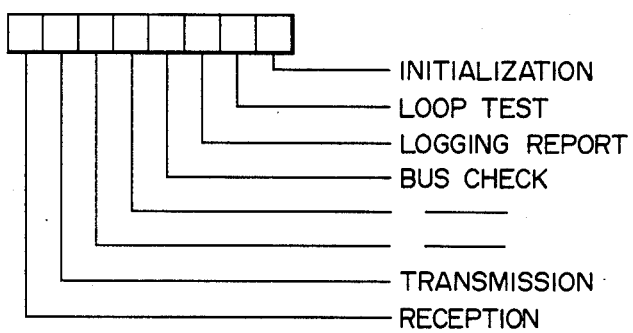
Figure 5C:
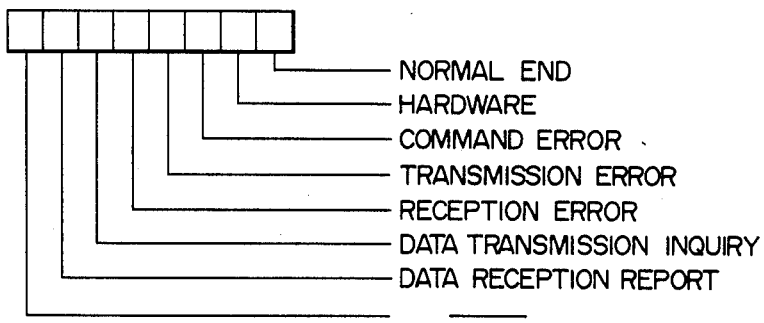
Figure 6:
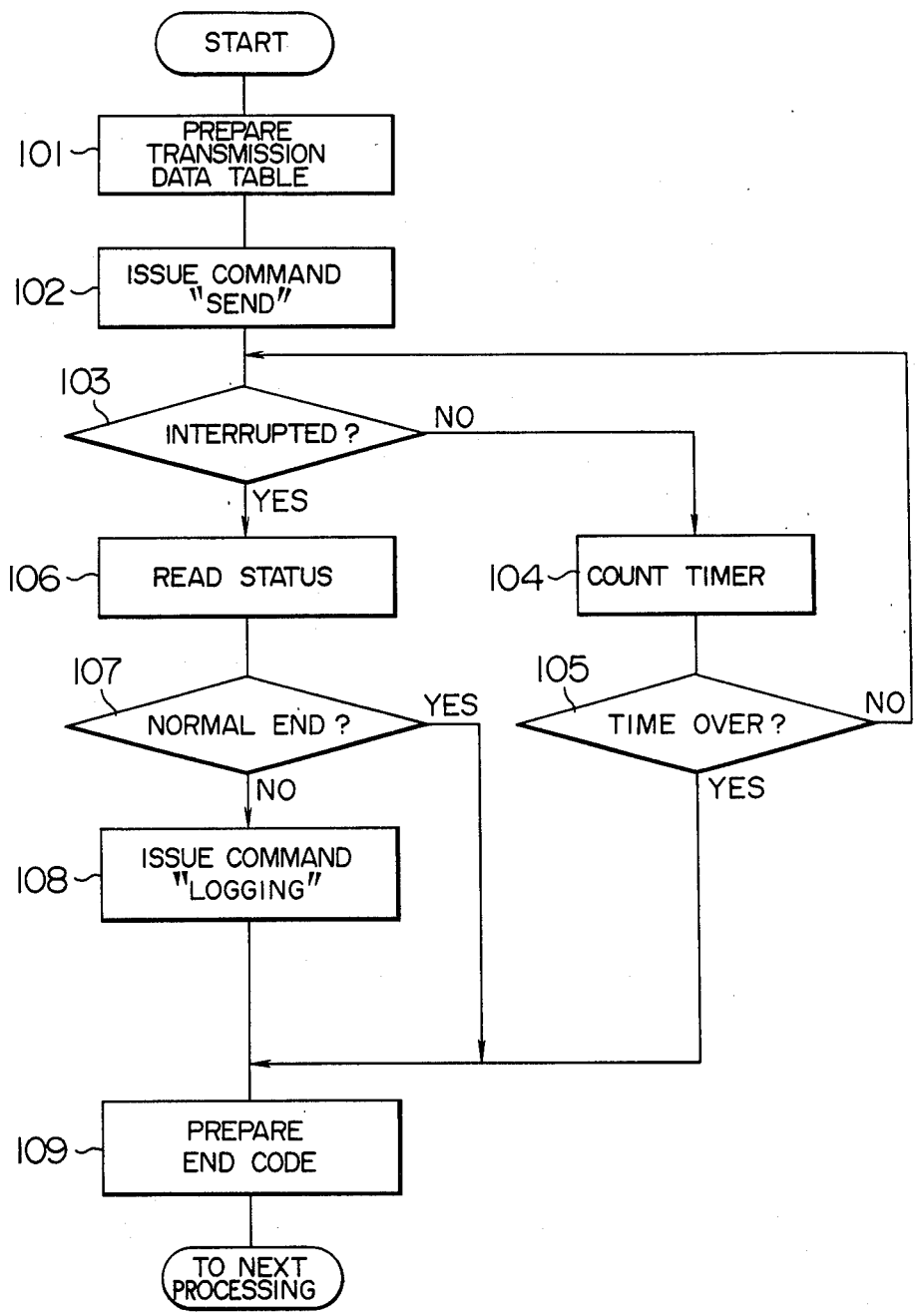
FIG. 6 shows a transmission flow chart of the main processor.

FIG. 5A shows a transmission/reception data table used for an interface between the main processor 5A and the sub-processor 6A, FIG. 5B shows a command format for illustrating types of commands delivered from the main processor 5A to the sub-processor 6A, and FIG. 5C shows a status format illustrating the contents of an interrupt status delivered from the sub-processor 6A to the main processor 5A.

When the HDLC (high level data link control) of the CCITT Standard is used as the data link level procedure in the present embodiment, the transmission data table of FIG. 5A includes fields in a frame, address field, command field and information field. In the present embodiment, the information field is of up to 512-byte length and a transmitted data is of up to 514-byte length including the address, command and information fields. A minimum length is 2-byte length, that is, only the address command field. The command shown in FIG. 5B includes an initialization field to designate whether the sub-processor is to operate as a service unit or a backup unit (slave station), a test field to check validity of a hardware of the sub-processor 6A, a logging report field to report a record of the operation of the sub-processor 6 to the main processor 5A, a bus check field for checking data transmission status of the data transmission line, and transmission and reception fields to transmit and receive data. The meaning of the bits of the interrupt status is shown in FIG. 5C. When the transmission error bit and the reception error bit are at a logical level "1", detailed information of the error is accompanied although it is omitted in the present embodiment. The test command includes a sub-command to indicate a type of test, although it is omitted in the present embodiment.

The backup operation for the service unit 3 and the backup unit 4 is explained with reference to flow charts of FIGS. 6 to 10.

The service unit 3 in FIG. 1A starts the master station control section 45 of FIG. 3. In the main processor 5A, when the application processing section 48 requests data transmission to the slave station 9, the master station control unit 45 starts the transmission operation in accordance with the flow chart of FIG. 6. When the communication processing section 49 for the application processing section 48 receives data prepared by the application processing section 48, the transmission/reception control section 53 prepares the slave station address and command field at the link level, and sets the transmission data length into the transmission data table (FIG. 5A). The data table is prepared in the RAM 13 and set into the interface 14 to the sub-processor 6A. Then, the command issuing section 51 sets the command "send" into the interface 14. Thereafter, the interrupt processing section 52 monitors the interruption from the sub-processor 6A in a timer monitor method as shown by blocks 103-107.

Figure 7:
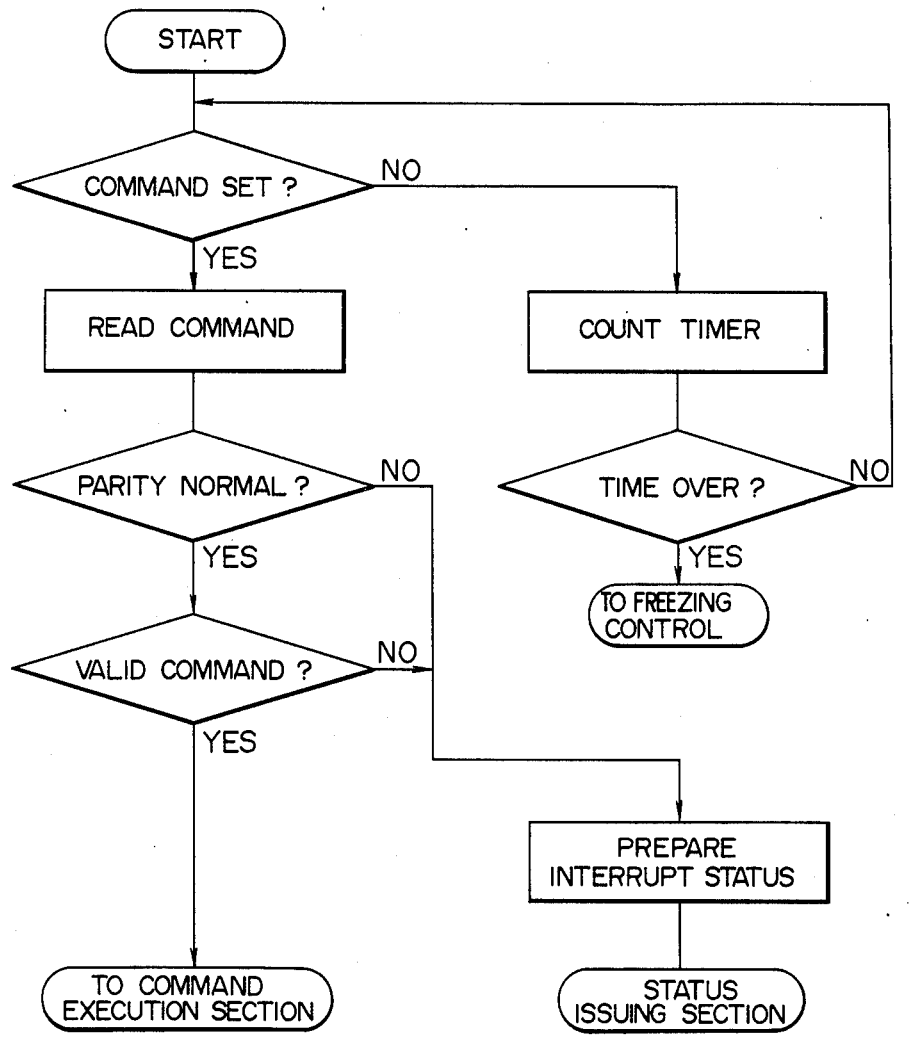
FIG. 7 shows a command flow chart of the sub-processor.
Figure 8:
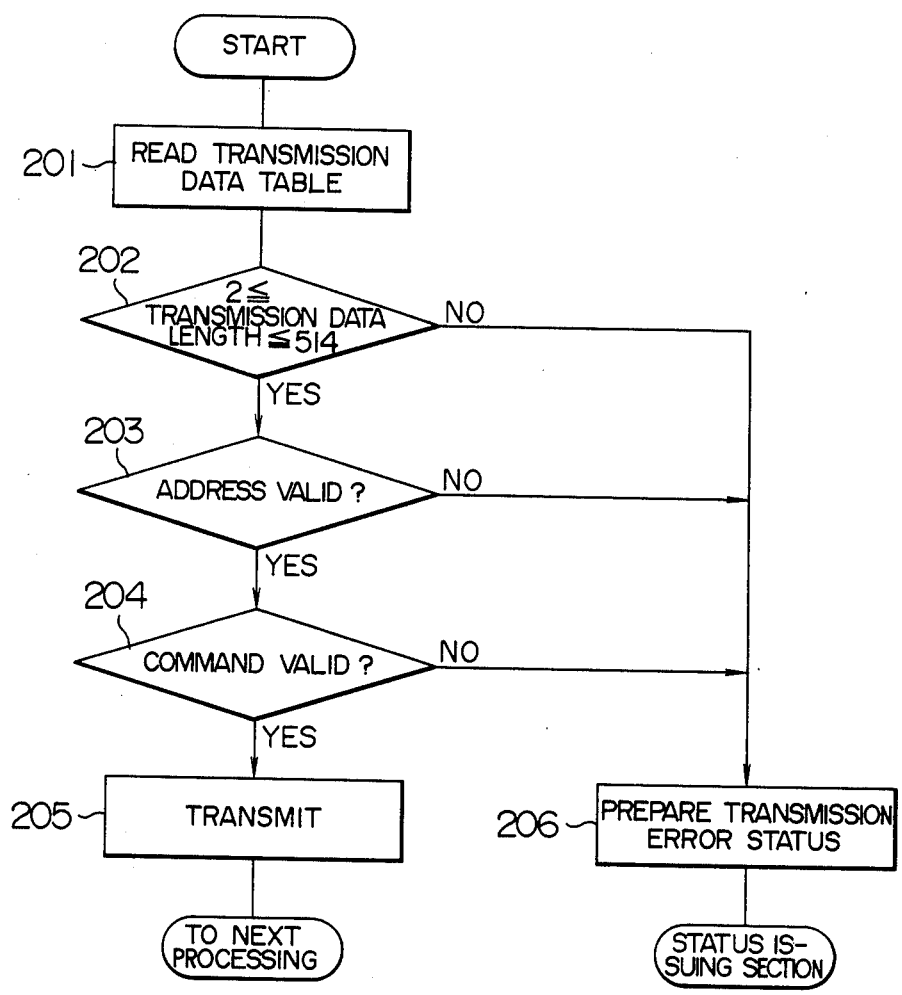
FIG. 8 shows a transmission flow chart of the sub-processor.
Figure 9:
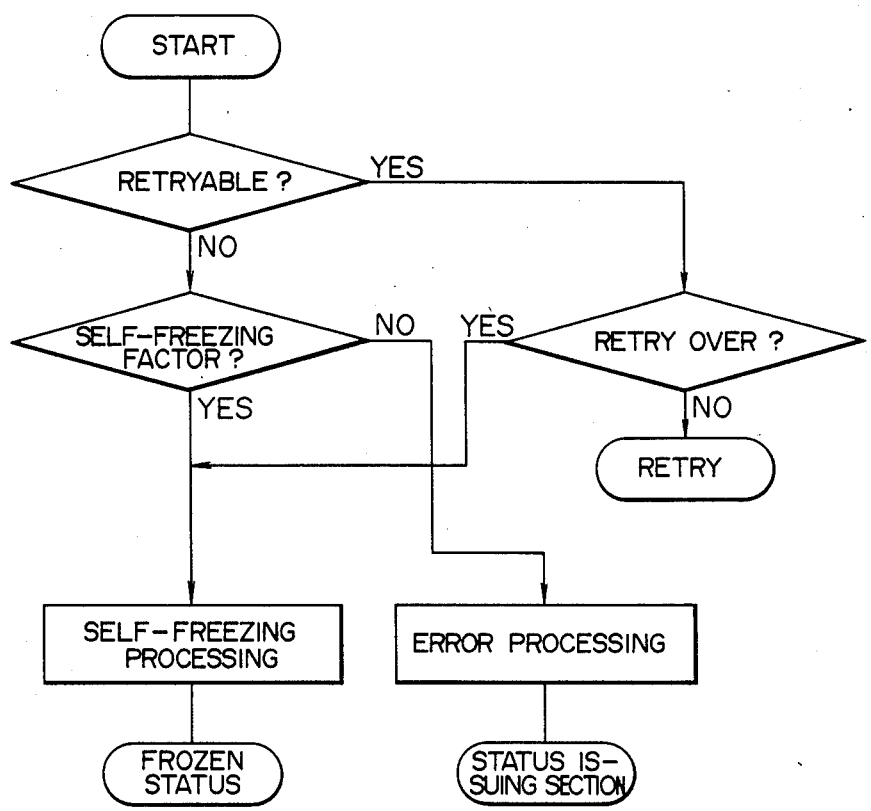
FIG. 9 shows a recovery processing flow chart of the sub-processor.

When the command processing section recognizes through the interface 16 to the main processor 5A that the main processor 5A has set the command, the sub-processor 6A reads the command in accordance with the flow chart of FIG. 7, checks parity and validity of the command, and if they are normal, checks the content of the command and starts the master station function control section 65. When the function control section 65 recognizes that the command is "send", it starts a send routine 70. As shown in FIG. 8, the send routine 70 first reads the transmission data table prepared by the main processor 5A through the interface 16, secondly checks if the transmission data length is between 2 bytes and 514 bytes, thirdly checks the validity of the address field, fourthly checks the validity of the command field, and if they are normal, sends the data to the slave station through the transmitter 25 and the data transmission line 8.

Let us assume that the transmission data length is 714 bytes due to an error in the interface 16. Thus, a transmission data length error is detected by the data length check routine shown in FIG. 8, an end code indicating the transmission data length error is generated, and the process returns from the transmission routine 70 to the master station function control section 65. When the master station function control section 65 detects the end code of the transmission error, the process returns to the monitor section 61. The monitor section 61 starts the recovery processing section 63 to perform the recovery processing in accordance with a flow chart of FIG. 9. The transmission data length error is a retryable error factor. It is assumed that the same error consecutively occurs and the number of times of retry is exceeded. The recovery processing section 63 then determines that it is an unrecoverable (uncorrectable) error and starts the freezing control section 68. The freezing control section 68 sets the signal line 33 of FIG. 2 to a logical level "1" by the I/O command to set the latch 24. As the output signal line 36 of the latch 24 is set to a logical level "1", the sub-CPU 18 is reset and the transmitter 25 is disabled through the inverter 27. Thus, the sub-processor 6A is electrically disconnected from the data transmission bus line 8. As the signal line 36 is set to a logical level "1", the latch 23 which indicates the master station is reset and the signal line 7 is reset to a logical level "0" so that the service unit 3 is disconnected from the central processing unit 1.

If there is no interruption request from the sub-processor 6A for more than a predetermined time period, the main processor 5A starts the recovery processing section 50 to perform the freezing processing of the sub-processor 6A, and resets the latch 23 and sets the latch 24 through the signal lines 31 and 32. At this time, the latch 23 has been reset and the latch 24 has been set by the self-freezing operation of the sub-processor 6A.

Figure 10:
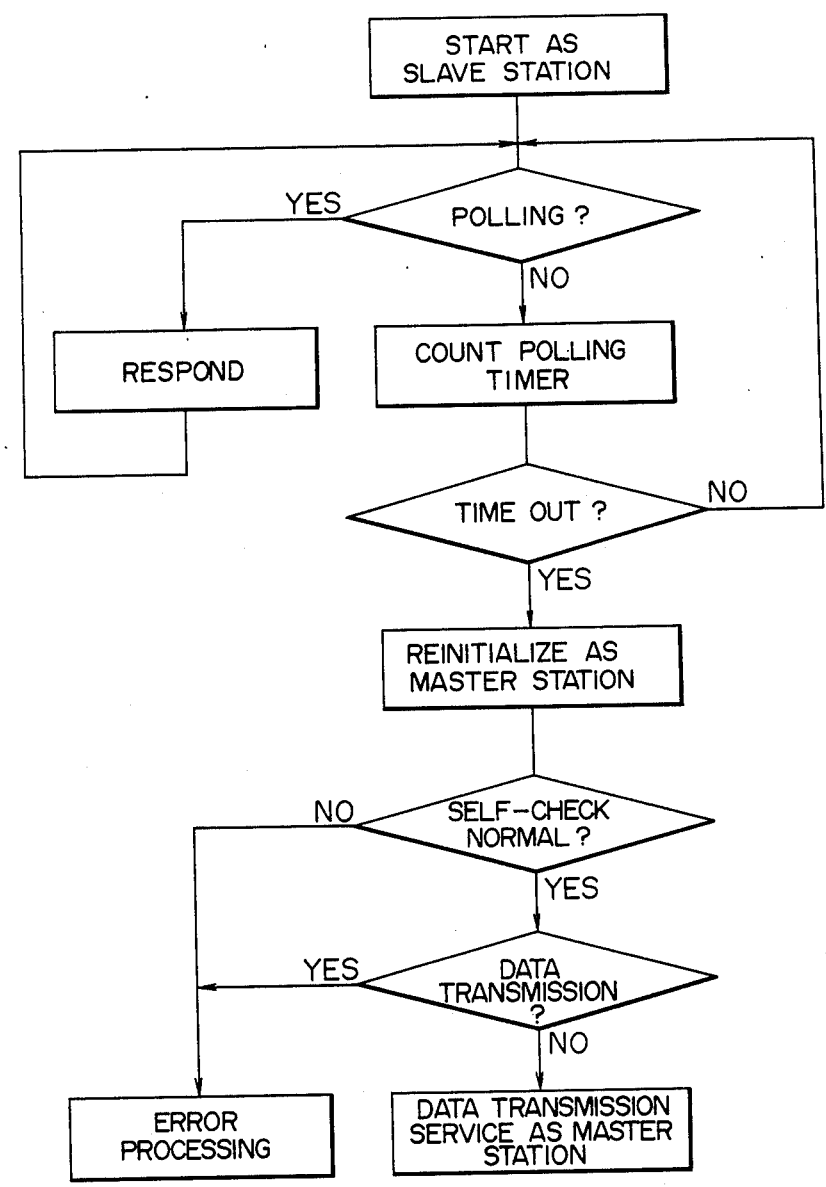
FIG. 10 shows a processing flow chart of the backup unit.

The backup unit is usually started as a slave station as shown in FIG. 10. As slave station control section 46 of FIG. 3 and the slave station function control unit 66 of FIG. 4 are started, the backup unit 4 monitors the polling to its own unit under the data transmission control from the service unit 3 which is the master station. As the service unit 3 ceases the data transmission control operation, the sub-processor 6B of the backup unit 4 detects the polling error and reports it to the main processor 5B as a kind of reception error. When the main processor 5B receives the polling error report, it starts the master station control section 45 of FIG. 3. The master station control section 45 reinitializes the sub-processor 6B as a master station. Then, the main processor 5B issues a command "test" to check the validity of the elements of the sub-processor 6B. The test may include a CRC (cycle redundancy check) test for the ROM 19, a write/read test for the RAM 20, and a self-loop test in whch transmission data is simultaneously received and the transmission data and the reception data are compared. The self-loop test includes an internal self-loop test in which a selector 28 selects an input to the transmitter 25 as the reception data, and an external self-loop test in which the selector 28 selects a output of the receiver 26. In the external self-loop test, since the data is sent to the data transmission bus line 8, only the station which operates as the master station executes such a test during a period between successive transmissions of polling signals.

Figure 11:
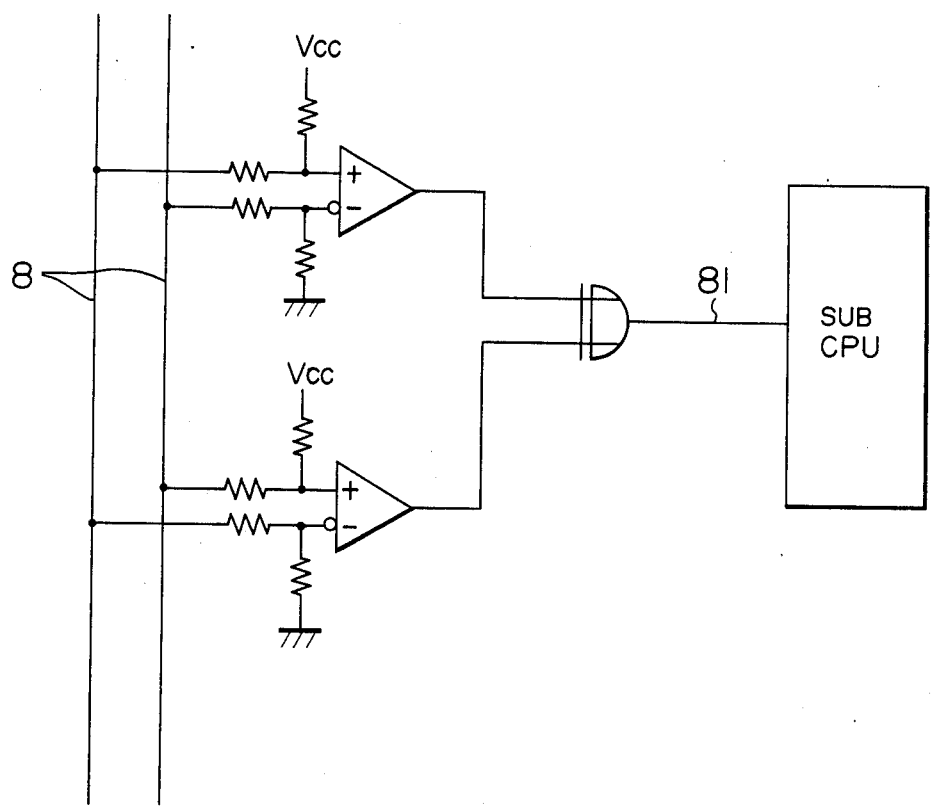
FIG. 11 shows a circuit configuration of an impedance detector.
Figure 12:
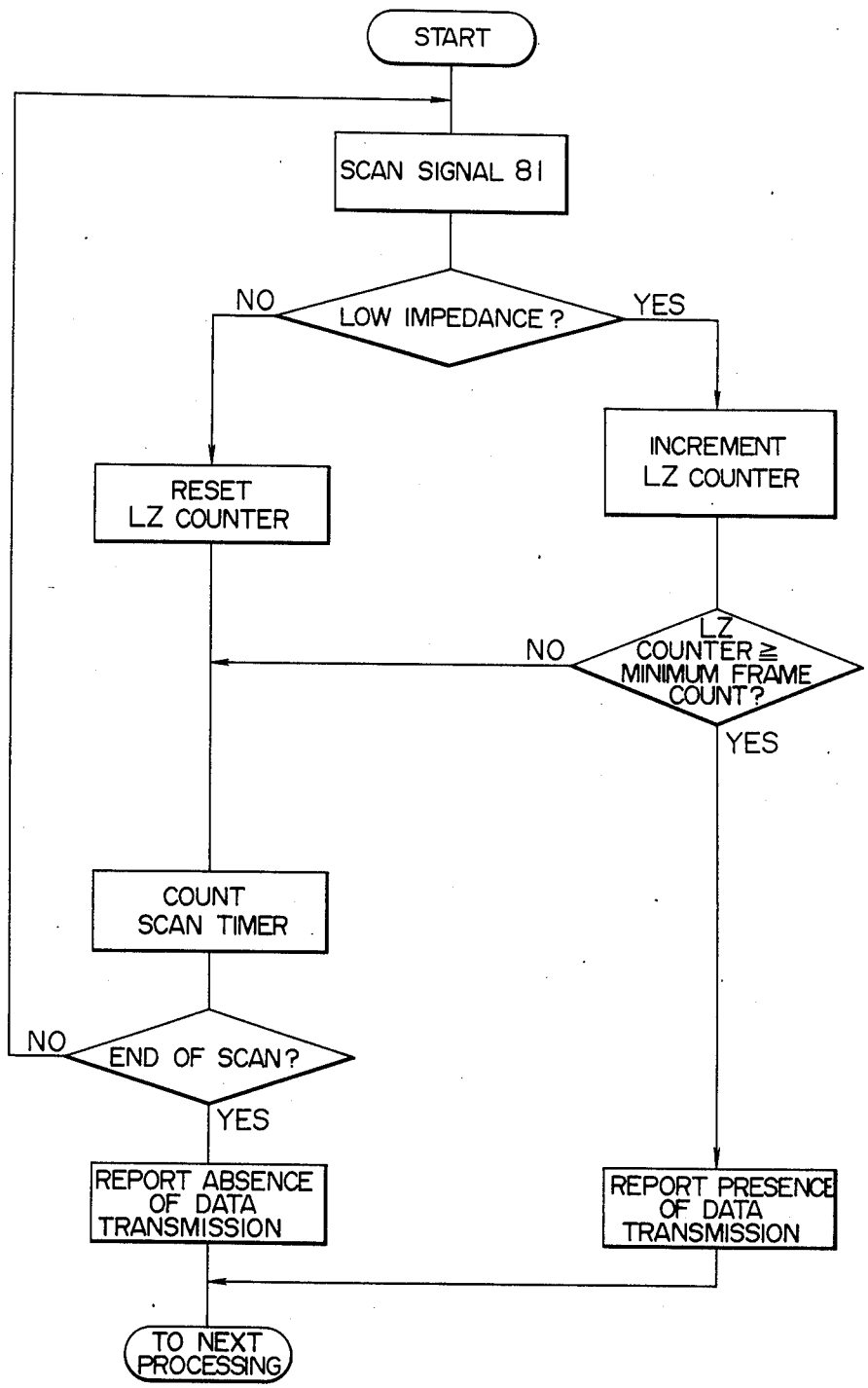
FIG. 12 shows a flow chart of an impedance check program.

If the validity is determined through the internal self-loop test in any appropriate time such as power-on time, the main processor 5B issues a command "check bus" to check presence or absence of the data transmission on the data transmission bus line 8 to determine that the service unit 3 is not carrying out the data transmission control operation. The method to check the presence or absence of the data transmission includes a method for detecting a data transmission carrier, which is conventionally known, and a method for detecting an impedance on the data transmission line. In the present embodiment, the data status is checked by program-scanning the impedance. FIG. 11 shows an embodiment of an impedance detector 29, and FIG. 12 shows a program structure for scanning the output of the impedance detector 29 and measuring durations of low impedance or high impedance (disconnection) status. A low impedance (LZ) counter shown in FIG. 12 measures the duration of the low impedance.

The sub-processor 6B checks the impedance on the data transmission bus line 8 in accordance with the flow chart of FIG. 12 and reports the absence of the data transmission to the main processor 5B by the content of the interrupt status. The main processor 5B then sets the signal line 34 to a logical level "1" by the output command to set the latch 23 which indicates the master station and start the communication with the central processing unit 1. The main processor 5B commands the transmission of the polling data to the sub-processor 6B and starts the data transmission control service as the master station.

The present invention can be applied to a multi-computer system which has a plurality of service units and at least one backup unit. In this kind of system, for example, a task of the system is shared and each service unit performs the shared task. If one of the service units is down, a backup unit will replace the shared task of the service unit. Each service unit sends a polling signal with a number or identification which is uniquely assigned, while it is in the valid state. The backup unit monitors the polling signals from the service units as to whether they come during each predetermined time period or not. When one of the service units is down or faulty, the processor thereof is frozen into a disable state in accordance with the scheme of the present invention. The backup unit detects which service unit is down in response to the number sent with the polling signal, and then replaces the data processing function of the fault service unit in accordance with the scheme of the present invention.

In accordance with the present invention described above, a plurality of elemental processors constituting the service unit, such as the main processor and the sub-processor are mutually monitored so that when the service unit is down, the sub-processor connecting the data bus line is frozen into a disable state and the service unit is thereby electrically or physically disconnected from the data bus line. Thus, the backup unit detects the error in the response from the service unit through the data bus line and checks the validity of the backup unit itself by the self-check, and then replaces the data processing function of the service unit. Accordingly, an overrun or disturbance caused due to failure of the service unit is essentially prevented, no dedicated signal line is required between the backup unit and the service unit to switch between the service unit and the backup unit, even when the backup operation is implemented in a daisy chain and the cost of the service/backup unit switching system is reduced and the error due to the control of the service/backup unit switching signal line is eliminated.

We claim:

1. A method for backing up a data transmission system including a plurality of data transmission service units each having a plurality of processing elements for processing signals, at least a slave station terminal and data transmission line for coupling said slave station terminal and said service units, comprising the steps of:
   (a) designating one of said data transmission service units as a service unit for said system and at least one other of said service units as a back unit;
   (b) said processing elements of said system service unit mutually monitoring each other as to whether they are operational and whether processing of signals by said processing elements produces valid results and said data transmission service unit disconnecting itself from said data transmission system by isolating itself from said data transmission line when an error or failure of said service unit is detected; and
   (c) monitoring the disconnection of said system service unit from said data transmission system by said backup unit through said data transmission line and starting said backup unit as the system replacement service unit when the disconnection is detected.

2. A method for backing up a data transmission system according to claim 1, wherein each of said processing elements contains a program for effecting self-diagnosing so as to monitor whether the signal processing results are valid and whether other processing elements are operating normally, and said system service unit becoming operationally disabled when an error is detected in any one of the processing elements therein.

3. A method for backing up a data transmission system according to claim 2, including data transmission being performed in a time sharing basis between said system service unit and said slave station, and when no error of said system service unit is detected, said backup unit is connected to said data transmission line in a manner to allow execution of an off-line processing or slave station function.

4. A method for backing up a data transmission system according to claim 3, wherein representation of an operation disabling is determined based on a combination of detected error factors.

5. A method for backing up a data transmission system according to claim 2, wherein said step (c) includes: detecting error factors, for monitoring the disconnection, such as polling error, transmission carrier abnormality, line impedance abnormality and absence of token from said data transmission line in said backup unit as an indication therein that operational disabling of said system service unit has resulted.

6. A method for backing up a data transmission system according to claim 1, wherein said step (c) includes the steps of: self-checking validity of results of data transmission control operation in said backup unit when an error in data transmission control operation of said system service unit is detected, and instructing a backup operation by said backup unit in accordance with the result of the self-check.

7. A method for backing up a data transmission system according to claim 1, wherein said step (b) includes the steps of: between a transmission/reception terminal of one of said plurality of processing elements which is directly connected to said data transmission line and a sub-central processing unit included in said one processing element, executing an internal self-loop check of selecting an input supplied to the transmission terminal and executing, in an intermediate period of the data transmission, an external self-loop check of selecting an output supplied from a reception terminal.

8. A method for backing up a data transmission system according to claim 1, wherein said system service unit is connected to a central processing unit when it is normal, collectively processes data supplied from the slave station and the service unit, and when it is abnormal, processes data using said backup unit as the system service unit.

9. A method for backing up a data transmission system according to claim 1, wherein said plurality of processing elements of said system service unit including a main processor for controlling the entire unit and a sub-processor for performing a specific processing, as a multi-processor.

10. A method for backing up a data transmission system according to claim 1, wherein said step of monitoring is effected by circuit means which monitors whether each of said processing elements of said system service unit is operational and whether the operation therein produces valid results, and wherein said system service unit becomes operationally disabled when an error or failure is detected by said circuit means in any one of said processing elements therein.

11. A data transmission processing system comprising at least one data transmission service unit, at least one designated backup unit having the same function as said service unit, at least one terminal and a data transmission line for coupling said terminal and said units,
each said service unit including:
a main processor for controlling the entire unit,
at least one sub-processor for performing one or more specific processings,
said main processor and said sub-processor including error detection means so that said main processor and said sub-processor mutually monitor each other as to whether they are operational and whether processings therein produce valid results, and
disconnection means for disconnecting said service unit from said data transmission processing system by isolating itself from said data transmission line in response to an error indication at an output of said error detection means; and
said backup designated unit including:
backup start means for detecting the disconnection of said system service unit through the data transmission line to start said backup unit as a replacement system service unit.

12. A data transmission processing system according to claim 11, wherein said service unit and said terminal operate in a time sharing fashion in an on-line mode and said backup unit operates as one terminal when said service unit is operating normally.

13. A data transmission processing system according to claim 12, wherein said main processor and said sub-processor of each of said units include means for storing recovery processing programs for detecting therein errors in the units.

14. A data transmission processing system according to claim 11, wherein said backup unit includes means for detecting absence of data transmission in response to a change in impedance of said data transmission line and means for logically ANDing the output of said absence detection means a polling data error output from said service unit so as to determine occurrence of any error in said service unit.

15. A data transmission processing system according to claim 11, wherein each of said service units and said backup unit includes bistable means for indicating a master station and a further means, coupled to said bistable means, for selectively connecting said service unit or said backup unit to a central processing unit for collectively processing data of the system in response to the set output of said latch means.

16. A data transmission processing system according to claim 11, wherein said data transmission line is an in-line network or local are network.

17. A data transmission processing system according to claim 11, wherein each said service unit and said backup unit includes an additional sub-processor interconnected to said main processor, and said sub-processor includes at least one of magnetic disk drive, floppy disk drive, magnetic card reader and file.

18. A data transmission processing system comprising at least one master unit having a data transmission service function, at least on backup unit having the same function as said master unit, a plurality of slave units having terminal functions, and a data transmission line for coupling said master unit, said backup unit and said slave units;
said master unit and said backup unit each comprising a plurality of processing elements and disabling means for disabling its corresponding unit from the remainder of said data transmission system when a fault or error in processing is detected therein;
said processing elements each including error detection means for detecting error by monitoring the other of said processing elements as to whether they are operational and whether processings therein provide valid results;

said disabling means operationally freezing the data transmission control operation of its own unit in response to the output of said error detection means and operationally disconnecting its own unit from said data transmission system by isolating the unit from said data transmission line; and said backup unit further comprising means for detecting a disabled status condition of the operation of said master unit based on the status of said data transmission line and signals therefrom and starting said backup unit as a master unit replacement in response to the detected output.

19. A method for backing up a data transmission system including a plurality of data transmission service units and a data transmission line connecting said units, each unit including a plurality of processing elements and disconnecting means for disconnecting the unit corresponding to said disconnecting means form the said data transmission line, comprising the steps:

designating one of said plurality of data transmission service units as a system service unit and at least one of the other of said service units as a backup unit to said system service unit;

the processing elements in said system service unit mutually monitoring each other as to whether they are operational and whether processings therein produce valid results and said system service unit effecting disconnection of itself from said data transmission system by electrically isolating itself from said data transmission line when an error or failure is detected therein; and monitoring occurrence of disconnection of said system service unit by said backup unit through said data transmission line, and starting up said backup unit as a replacement system service unit in response thereto.

20. A method according to claim 19, wherein in said system service unit, said step of mutually monitoring includes detecting an error or failure in the operation of other processing elements, disabling the operation of said system service unit, and disconnecting said service unit from said data transmission line in response to detection of the error or failure in any one of said processing elements therein.

21. A data transmission processing system comprising at least one data transmission service unit, at least one backup unit having substantially the same functions as said service unit, and a data transmission line for interconnecting said service unit and said backup unit, said service unit including:

a main processor for controlling the entire unit, at least one sub-processor for performing one or more specific processings, error/failure detection means provided in said main processor and in said sub-processor for mutually monitoring each other as to whether they are operational and whether operations therein produce valid results by generating an output indicating a failure of the entire service unit upon detection by an error/failure detection means in one of said main processor and sub-processor of an error or failure in the other processors, and disconnection means responsive to an indication of an error or failure at the output of a respective error/failure detection means for disconnecting said service unit from said data transmission line; and said backup unit including:

disconnection detection means connected to said data transmission line for generating an output in response to detecting occurrence of disconnection of said system service unit from said data transmission line; and backup start means responsive to the detection output of said disconnection detection means for starting the operation of said backup unit as a replacement for said system service unit.

22. The system according to claim 21, wherein said main processor and said sub-processor each include a program-operated circuit to detect an error or failure present in the other processor.

23. The system according to claim 21, wherein said backup unit includes means for self-checking the operation of its own circuits to monitor the validity of the results corresponding to the operation of the backup unit, and impedance checking means for checking for abnormality in the impedance of the data transmission line, and startup permission means, including an AND logic operation, responsive to the outputs of said self-checking means and said impedance checking means for permitting said backup unit to start up only when both the impedance of said transmission line and the backup unit circuit operation are detected as normal.

24. The system according to claim 23, wherein said startup permission means is operable in response to detection of failure of polling by said transmission service unit.

25. The system according to claim 21, wherein said service unit includes an error detect circuit to detect an error or failure in the operation of said main processor and said sub-processor and a disable means, responsive to said error detect circuit, for disabling the operation of the entire service unit in response to detection of the error or failure in any of said processors to thereby disconnect the service unit from the transmission line.

* * * * *